US 6,675,371 B1

United States Patent
York et al.

(10) Patent No.: US 6,675,371 B1
(45) Date of Patent: Jan. 6, 2004

(54) JAVA AND NATIVE APPLICATION WINDOW INTEGRATION

(75) Inventors: Justin E. York, Houston, TX (US); Geoffery A. Schunicht, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/303,799

(22) Filed: Apr. 30, 1999

(51) Int. Cl.[7] .............................. G06F 9/44; G06F 9/00
(52) U.S. Cl. ...................... 717/114; 717/118; 717/119; 709/100
(58) Field of Search ..................... 717/114–119, 121, 717/149, 3, 5, 127, 138, 139, 161; 703/27; 709/310, 9, 313, 328, 329, 100–108; 712/228, 229, 241; 345/781, 749, 748, 764, 765, 806, 804

(56) References Cited

U.S. PATENT DOCUMENTS

| | | | | | |
|---|---|---|---|---|---|
| 5,301,268 A | * | 4/1994 | Takeda | .......................... | 709/329 |
| 5,313,581 A | * | 5/1994 | Giokas et al. | ............... | 709/100 |
| 5,613,090 A | * | 3/1997 | Willems | ..................... | 709/329 |
| 5,613,114 A | * | 3/1997 | Anderson et al. | ........... | 709/108 |
| 5,694,604 A | * | 12/1997 | Reiffin | .......................... | 709/107 |
| 5,774,720 A | * | 6/1998 | Borgendale et al. | ........ | 709/329 |
| 5,815,727 A | * | 9/1998 | Motomura | ...................... | 712/1 |
| 5,842,020 A | | 11/1998 | Faustini | ....................... | 395/701 |
| 5,913,032 A | * | 6/1999 | Schwartz et al. | ........... | 709/213 |
| 5,920,697 A | * | 7/1999 | Masters et al. | ............. | 709/219 |
| 5,941,954 A | * | 8/1999 | Kalajan | ....................... | 709/239 |
| 5,974,256 A | * | 10/1999 | Matthews et al. | .......... | 717/119 |
| 6,052,708 A | * | 4/2000 | Flynn et al. | ................. | 709/108 |
| 6,074,432 A | * | 6/2000 | Guccione | .................... | 717/118 |
| 6,085,247 A | * | 7/2000 | Parsons, Jr. et al. | ........ | 709/227 |
| 6,192,417 B1 | * | 2/2001 | Block et al. | ................. | 709/249 |
| 6,292,842 B1 | * | 9/2001 | Crouch et al. | ............... | 709/329 |
| 6,427,229 B1 | * | 7/2002 | Brobst et al. | ................ | 717/114 |
| 6,530,075 B1 | * | 3/2003 | Beadle et al. | ................ | 717/114 |

OTHER PUBLICATIONS

Blocking Modal Dialog Support for Java. IBM Technical Disclosure Bulletin. Apr. 1997. pp. 151–152.*
Lesson: Integrating Java and Native Programs. http://java.com/docs/books/tutorial/native1.1/integrating/idex.html.*
Java 2 Platform, Standard Edition, v1.2.2 API Specification; Class Window, http://java.sun.com/products/jdk/1.2/docs/api/java/awt/Window.html, Sun Microsystems, Inc. (1998), 11 pages.
Java 2 Platform, Standard Edition, v1.2.2 API Specification; Class Window, http://kbs.cs.tu–berlin.de/~jutta/ht/apibook/javac15.htm, Sun Microsystems, Inc. (1996), 3 pages.
Windows Software Development Kit documentation. PostMessage (2 pages) http://msdn.microsoft.com/library/sdk-doc/winui/messques_87mt.htm.
Windows Software Development Kit documentation. GetMessage (2 pages) http://msdn.microsoft.com/library/sdk-doc/winui/messques_10kl.htm.

(List continued on next page.)

Primary Examiner—Wei Zhen

(57) ABSTRACT

A system for adding functionality to a graphical user interface of a non-Java based, or native, application, using the Java programming language is provided. A Java window, or dialog, is configured to be accessible by a native application. While the native application is executed in a first thread, a Java dialog is launched in a second thread. Execution of the native application in the first thread is then continued. The Java dialog next calls the native application and registers itself with the native application. Also, the native code can control the Java dialog like other dialogs supported by the native code. A command for a Java dialog from a native application is routed to an invisible dialog. The invisible dialog passes that command to the Java dialog through a native interface connection. A very seamless integration between the Java and native code thus occurs. The graphical user interface operates and visually appears as if controlled from a single source of code.

27 Claims, 11 Drawing Sheets

OTHER PUBLICATIONS

Windows Software Development Kit documentation. RegisterClass (1 page) http://msdn.microsoft.com/library/sdkdoc/winui/winclass_70s3.htm.

Windows Software Development Kit documentation. RegisterClassEx (1 page) http://msdn.microsoft.com/library/sdkdoc/winui/winclass_0wc8.htm.

Windows Software Development Kit documentation. UnregisterClass (1 page) http://msdn.microsoft.com/library/sdkdoc/winui/winclass_70bjn.htm.

Windows Software Development Kit documentation. Registering Window Classes (2 pages) http://msdn.microsoft.com/library/sdkdoc/winbase/unicode_5kfn.htm.

Windows Software Development Kit documentation. DispatchMessage (1 page) http://msdn.microsoft.com/library/sdkdoc/winui/messques_55b9.htm.

Windows Software Development Kit documentation. Receiving and Dispatching Messages (1 page) http://msdn.microsoft.com/library/sdkdoc/wince/window_10ab.htm.

Windows Software Development Kit documentation. RegisterWindowMessage (1 page) http://msdn.microsoft.com/library/sdkdoc/winui/messques_10hl.htm.

Microsoft Library. FindWindow () API Library Routine (2 pages) http://msdn.microsoft.com/library/devprods/vs6/vfoxpro/html/lng_findwindowlp_rp.htm.

Microsoft Library. Sizing and Positioning a Window (2 pages) http://msdn.microsoft.com/library/tools/wceui/window_7.htm.

Microsoft Library. About the Multiple Document Interface (1 page) http://msdn.microsoft.com/library/sdkdoc/winui/mdocint_3did.htm.

Microsoft Library. Multiple Document Interface (1 page) http://msdn.microsoft.com/library/sdkdoc/winui/mdocint_6crp.htm.

Microsoft Library. Multiple–Document Interface (MDI) Applications (2 pages) http://msdn.microsoft.com/library/de.../vbconmultipledocumentinterfacemdiapplications.ht.

Microsoft Library. Multiple Document Interface (2 pages) http://msdn.microsoft.com/library/books/winguide/platfrm2/d5/s11164c.htm.

Microsoft Library. Using a Multithreaded Multiple Document Interface Application (5 pages) http://msdn.microsoft.com/library/sdkdoc/winbase/prothred_3msu.htm.

*Java Application Programming Interface User's Guide* (3 pages) http://www.warwick.ac.uk/~cudce/jdk1.1.7B/docs/api/API_users_guide.html.

*Class java.lang.Thread* (15 pages) http://www.warwick.ac.uk/~cudce/jdk1.1.7B/docs/api/java.lang.Thread.html.

Java Native Interface Specification (16 pages total): Table of Contents (3 pages) http://java.sun.com/products/jdk/1.2/docs/guide/jni/spec/jniTOC.doc.html; Introduction (5 pages) http://java.sun.com/products/jdk/1.2/docs/guide/jni/spec/intro.doc.html; Design Overview (8 pages) http://java.sun.com/products/jdk/1.2/docs/guide/jni/spec/design.doc.html.

"The Java Saga"—Wired Archive 3.12—Dec., 1995 (9 pages) http://java.wired.com/wired/archive/3.12/java.saga_pr.html.

Java and the Java Runtime Environment (3 pages) http://www.sun.com/solaris/java/wp-java/2.html.

Win32 Window Hierarchy and Styles (8 pages) http://www.microsoft.com/win32dev/ui/styles32.html.

Window Classes in Win32 (11 pages) (Jan. 25, 1994) http://msdn.microsoft.com/library/techart/msdn_classy32.html.

Invoking the Java Virtual Machine (2 pages) http://java.sun.com/docs/books/tutorial/native1.1/invoking.invo.html.

Lesson: Compiling and Running a Java Program with a Native Method (3 pages) http://java.sun.com/docs/books/tutorial/native1.1/stepbystep/index.html.

What is the Java Platform? (7 pages) http://java.sun.com/docs/white/platform/javaplatform.doc1.html.

A Look Inside the Java Platform (6 pages) http://java.sun.com/docs/white/platform/javaplatform/doc2.html.

Java Compile and Runtime Environments (1 page) http://java.sun.com/docs/white/platform/javaplatform/doc3.html.

Lesson: Overview of the JNI (2 pages) http://java.sun.com/docs/books/tutorial/native1.1/concepts/index.html.

Java™ Development Kit (JDK) and Javabeans™ Arrive (5 pages) http://www.javasoft.com/features/1997/feb/jdkbeans.html.

VisualCafé 3.0 (2 pages) http://www.symantec.com/domain/cafe/vcafe30.html.

The Java™ Platform, A White Paper, JavaSoft, Kramer et al. (May 1996) (24 pages).

The Java™ Virtual Machine Specification, $2^{nd}$ Ed., Lindholm et al. table of Contents (pp. 1–5) http://java.sun.com/docs/books/vmspec/2nd-edition/html/VMSpecTOC.doc.html; Preface (pp. 1–3) http://java.sun.com/docs/books/vmspec/2nd-edition/html/Preface.doc/html; Chapter 1—Introduction (pp. 1–3) http://java.sun.com/docs/books/vmspec/2nd-edition/html/Introduction.doc.html; Chapter 2—Java Programming Language Concepts (pp. 1–37) http://java.sun.com/docs/books/vmspec/2nd-edition/html/Concepts.doc.html;Chapter 3—The Structure of the Java Virtual Machine (pp. 1–21) http://java.sun.com/docs/books/vmspec/$2^{nd}$-edition/html/Overview.doc.html.

* cited by examiner

JAVA AND NATIVE APPLICATION WINDOW INTEGRATION

BACKGROUND OF THE INVENTION

1. Field of the Invention

The invention relates to integrating Java-based dialogs with native dialogs in an application program and, more particularly, to resolving inadequacies of a native interface.

2. Description of the Related Art

In the pre-Java programming paradigm, an application program was typically written in a high-level programming language, such as C, C++, or Visual Basic. Before compiling the program, or converting it into a machine-readable format, the application developer was forced to decide the environment in which the application was to be used, known commonly as a platform. The platform is made up both of the CPU that runs the application software and the operating system upon which the application software is loaded. A platform-specific compiler was then selected to convert the high-level program into a binary file suitable for that platform to run the program.

Unfortunately, the output of these compilers was usually understood only by the target platform. So, even though the application was written using a portable, high-level source code, with the goal of platform independence, each compiler outputted platform-specific code. The end result, for most application developers, was that a decision about which platform was being supported had to be made before any code was written.

Then, a new programming language, Java, emerged, along with a new programming paradigm. Java is a programming language, developed in the 1990s by Sun Microsystems of Palo Alto, Calif. A program written in Java compiles to a file, known as a bytecode file. A bytecode file can run wherever a Java virtual machine resides; thus, the bytecode is not specific to any physical machine. Sun describes the Java virtual machine, or JVM, as an abstract machine or "soft" computer that can be implemented in either hardware or software, to reside on top of existing platforms.

Unlike compilers under the old paradigm, there is only one specification for the Java Virtual Machine. (Virtual machines are available from a great many vendors, including Sun, Netscape, IBM, etc. Those virtual machines which adhere to the original virtual machine specification are known as "pure Java" VMs.) So, an application developer who uses the Java language can rest assured that the application runs on any Java-capable platform: that is, any platform upon which a Java virtual machine resides. (Slight differences may appear on the GUI, but these are visual, not functional, differences.) This portability makes Java particularly suited for use on the Internet.

The Java virtual machine is also flexible in how it is implemented. The Java virtual machine may be installed onto a machine as a distinct application program, may be embedded within the operating system that resides upon the machine, or may be part of an application program which uses a Java virtual machine. Many browsers and operating systems today are touted as "Java-capable" because they include a Java virtual machine.

The presence of this new programming paradigm presents both new opportunities and new concerns. For one thing, an enormous installed base of application programs, written in other high-level programming languages under the old paradigm, are still being used and maintained. However most Java-aware developers understandably want to develop new applications, or add functionality to existing applications, using Java. The "write-once, run anywhere" promise of Java bytecode eliminates the need for the developer to rewrite an application for each possible platform. Thus, it may be sensible for developers to write all new code in Java where possible.

When developing new applications, it may be possible to write the application entirely in Java. For adding new functionality to an existing application, however, some mechanism for allowing newly developed, Java-based bytecode to interact with the legacy, or native, application software, is required.

A software development kit, known as the Java Development Kit, or JDK, provides several programs to assist Java developers. The Java Virtual Machine, described above, is one of its many components. Additionally, the development kit includes an application programming interface known as the Java Native Interface, or JNI. As named, JNI provides a mechanism for interfacing between native software programs and newly developed Java-based bytecode.

The JNI allows code that runs inside a Java virtual machine (bytecode) to inter-operate with applications written in other high-level programming languages. Developers who program through the JNI enable native code to interact with Java code, including: creating, viewing, and updating Java objects, calling Java methods, loading and obtaining class information, handling exceptions, and the like.

Despite its best intentions, JNI may be inadequate in some environments. For example, the Win32 application programming interface, or API, permits application developers to maintain different windows, or dialogs, in a graphical user interface, or GUI. As is further developed, below, the mechanism provided by JNI for interaction between native code and Java-based code is inadequate. For one thing, the Java-based dialog is visually distinct, making its appearance on a user interface with other native dialogs look out-of-place. Second, calls to methods through the JNI causes the native code to block. This blocking nature of JNI causes a stoppage of message handling in the native dialogs, thus making the application appear to be locked up or non-responsive. Third, the native code is limited in its ability to manipulate a Java-based dialog under the JNI specification. For example, the native code cannot control any of the Java-based dialogs that it created.

The choices for resolving the limitations imposed by the JNI are very unattractive. First, the developers could completely rewrite the existing native code in Java, eliminating the need to use the JNI at all. Such an approach is generally not feasible because of the large amount of code that must be rewritten. Second, a development team could restrict all Java coding to non-GUI elements. Under such a limited environment, JNI would be sufficient. However, GUIs are a large part of most applications, requiring developers to maintain multiple versions of user interface code for each platform supported. Furthermore, if the native code is never phased out, the high level of portability that makes Java-based development attractive remains elusive.

Ultimately, these unattractive choices severely restrict the benefits of JNI and effectively divert developers from adding new features to native applications using Java.

SUMMARY OF THE INVENTION

Briefly, the illustrative system provides a method for adding functionality to a user interface of non-Java based, or native, applications, using the Java programming language. Further, the illustrative system provides a method for Java-based and non-Java-based windows, or dialogs, to communicate in an application program on a graphical user interface.

To add functionality to the user interface of the native application, new dialog support is written in the Java programming language. Under the standard protocol, a call to the Java Native Interface (JNI) blocks and waits for the function call to complete, then accepts a return value. In the system illustrated herein, however, the JNI calls do block, as normal, but, once a Java thread is created, control immediately returns to a separate thread where the native application can run. Following the creation of the Java thread, message passing between the thread and the native application is implemented, to "register" the Java dialog with the native application.

Following the registration, the Java-based dialog performs its intended function as a thread separate from the native code. When the native code receives the information for registering the Java dialog, it determines the handle of the Java dialog and then creates its own "invisible" dialog. The invisible dialog is subsequently used for all message passing to the Java dialog.

The result is a very seamless integration on a graphical user interface between the Java-based code and the native code. From the perspective of the user, the interface operates and visually appears as if controlled from a single source of code. In one embodiment, a native icon is displayed on the Java dialog, rather than a generic Java icon, so that the Java dialog "matches" the native dialogs in appearance.

Further, the registration between the Java-based code and the native code enables the native code to perform additional tasks upon the Java dialog. In addition to providing a Java-based icon similar to a native icon, the native code can detect the presence of the Java dialog or tell the Java dialog to close or move to a certain position on the screen, features which were not possible using the standard JNI protocol. In another embodiment, the native code can further capture the Java dialog into a multi-document interface, or MDI, framework, so that the Java dialog is virtually indistinguishable from the native dialogs in the application. Thus, the illustrative system provides tight Java and native window-level integration that gives the Java dialogs a similar "look and feel" to the native dialogs.

The illustrative system can particularly be used when augmenting a native code-based application with Java. Using the techniques described herein, a "bridge" between new Java code and an existing native code is provided. This gives the graphical user interface (GUI) a consistent "look and feel," even though different technologies are used to develop the various GUI components.

BRIEF DESCRIPTION OF THE DRAWINGS

A better understanding of the present invention can be obtained when the following detailed description of the disclosed embodiment is considered in conjunction with the following drawings, in which.

DETAILED DESCRIPTION OF PREFERRED EMBODIMENT

Figure 1:
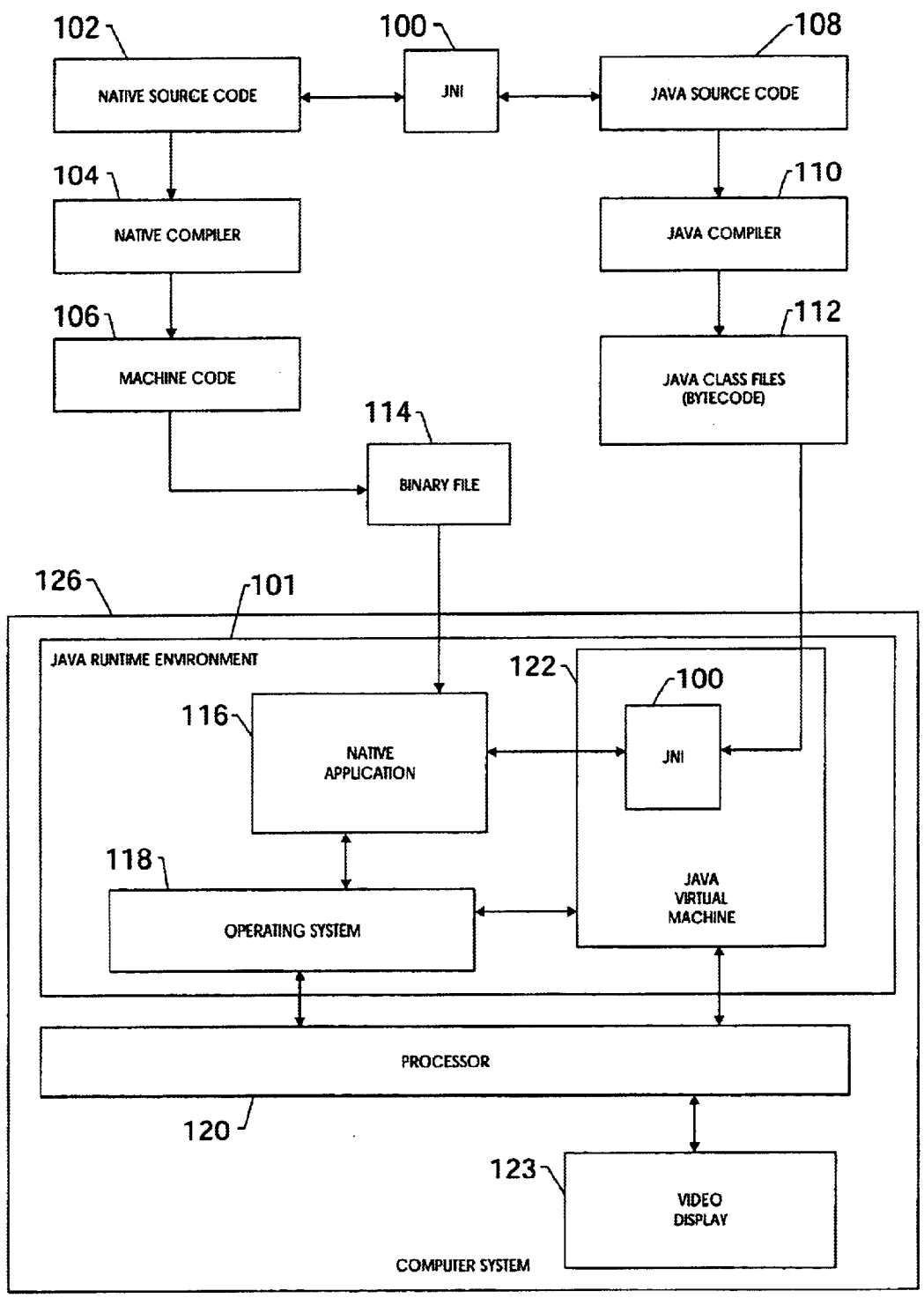
FIG. 1 is a block diagram illustrating generally the Java Native Interface and its interaction with other components of a computer system.

The illustrative system provides a method for adding functionality, particularly user interface support, to native code using the Java programming language. For purposes of explanation, specific embodiments are set forth to provide a thorough understanding of the present invention. However, it will be understood by one skilled in the art, from reading the disclosure, that the invention may be practiced without these details. Further, although the embodiments are described in terms of Windows-based application programming, most, if not all, aspects of the system illustrated apply to interfacing any high-level program to the Java language. Moreover, well-known elements, devices, process steps, and the like, are not set forth in detail in order to avoid obscuring the disclosed system.

The Java Native Interface Specification, a product of Sun Microsystems of Palo Alto, Calif., published on May 16, 1997 and available on the world-wide-web at http://www.javasoft.com/products/jdk/1.1/docs/guide/jni/spec, is hereby incorporated by reference as if set forth in its entirety.

A network management application describes network management models and their use in web environments in commonly assigned U.S. patent application Ser. No. 09/231,286 entitled "Interactive Web-based Network Management" to Geoffery A. Schunicht, Justin E. York, Peter A. Hansen, and Charles W. Cochran, filed on Jan. 15, 1999, which is hereby incorporated by reference as if set forth in its entirety.

A second application describes a method for interfacing between network management software and the modules supporting devices on a network. This commonly assigned U.S. patent application Ser. No. 09/303,308, entitled "Intelligent PMM Application Programming Interface With Utility Objects" to Geoffery A. Schunicht and Justin E. York, and was filed concurrently, which is also hereby incorporated by reference as if set forth in its entirety.

First, an illustration of the Java Native Interface, or JNI, provides a introduction to the various elements that may interact in an application programming environment. A Java Native Interface 100, or JNI 100, is shown, coupled between a native source code 102 and a Java source code 108. JNI can refer to any interface that is effectively compliant with the JNI standard. As stated in the Background section, the JNI is a native programming interface that allows Java code (bytecode) that runs inside a Java Virtual Machine to interoperate with applications and libraries written in other high-level programming languages. Programmers use JNI to write Java native methods to handle situations where an application cannot be written entirely in Java. An application may support platform-dependent features that aren't supported by the standard Java class library. Or, new support for an existing application, written in a high-level language, may be desired. A variety of situations requiring interrelationship between native code and Java-based code may present themselves to the application programmer.

FIG. 1 shows a typical computer system 126 supporting a Java runtime environment (JRE) 101. The computer system 126 includes a processor 120, which may be an 8086-based CPU, such as a Pentium II Processor, a product of Intel Corporation, of Santa Clara, Calif. Or, the processor 120 may be a Power PC-based processor, a product of Motorola Corporation, of Austin, Tex. In either case, the processor 120 is a key component of the computer system 126. The processor 120 is shown coupled to a video display 123. The video display 123 provides an interface to the user of the computer system 126 by displaying an application program, often in the form of a graphical user interface.

The Java runtime environment 101 includes an operating system 118, such as the Windows 95 operating system, a product of Microsoft Corporation, of Redmond, Wash. A variety of other operating systems may optionally be selected for inclusion in the Java runtime environment 101.

Notice that the native source code 102 and Java source code 108 proceed along distinct paths. As is well-known among programmers, the native source code 102 is compiled, using a native compiler 104, to produce machine code 106. Generally, the native compiler 104 selected is dependent upon the processor 120 and the operating system 118 upon which an application ultimately runs. The machine code 106 may be linked with other machine code (not shown) to produce an executable file, a binary file 114, for execution in the computer system 126.

The Java source code 108 proceeds along a separate path. This time, the Java source code 108 is compiled by a Java compiler 110, to produce a Java class file 112, known as bytecode. As with the native compiler 104, the Java compiler 110 is dependent upon the runtime environment 101 in order for compilation to take place. However, unlike the native source code 102, the Java source code 108, once compiled, produces the same output, no matter where it is compiled.

As described above, the Java runtime environment 101 includes a Java virtual machine 122, in order to run the Java class file 112. In FIG. 1, the Java virtual machine 122 is shown as a distinct element. However, the Java virtual machine 122 can be implemented in hardware or software. Further, the Java virtual machine 122 can be embedded in the operating system 118 or in a native application 116, loaded on top of the operating system 118.

The Java virtual machine 122 also shows the Java native interface 100 included therein. Communication between the binary file 114 and the Java bytecode 112 occurs through the JNI 100. Native code accesses Java features by calling JNI functions, called Java native methods. In FIG. 1, the Java virtual machine 122 is shown coupled to both the native application 116 and the operating system 118.

Next, to better understand some of the limitations of JNI, a discussion about how graphical user interfaces, or GUIs, are typically maintained may be helpful. The illustration to follow describes a particular embodiment, using Windows Win32 Application Programming Interface, or API. (The Win32 API currently permits applications written for it to work under the Windows 95, Windows NT, and Windows 98 operating systems.) Therefore, in the disclosed embodiment, the native application 116 is a Win32 application. However, this embodiment is not meant to in any way limit the possible applications of the illustrative system to other programming environments.

The Win32 API provides a mechanism for an application programmer to readily create graphical user interfaces, or GUIs, in the form of windows or dialogs. One skilled in the art understands a dialog to be a rectangular region of a screen to display data or act as a useful input area. Most computer users today are quite familiar with such interfaces. What may be less familiar to the user is how the processing of each dialog occurs during the operation of the user interface.

One mechanism for supporting multiple dialogs on a graphical user interface is employed by applications written under Win32 API. First, the many entities supporting the GUI, discussed in more detail below, communicate by sending and receiving "messages." Messages permit the entities to perform a vast number of operations upon the dialogs, such as resizing the dialog, changing the name of the dialog, and changing the color of the dialog. For purposes of this discussion, though, it is only important to know that messages are sent and received.

For communicating these messages, the mechanism is pretty simple. First, the application program contains a continuously running, very tight, loop which does nothing more than receive and dispatch messages. The messages are typically processed in a first-in-first-out fashion, but the application program code decides how and even whether the messages are processed. (The application program code may even decide not to process certain messages, or messages from certain sources.)

Second, the application program generally includes one or more message handlers. These handlers may be a single message handler for each dialog, a message handler for all dialogs of a certain type, a message handler for dialogs which perform a specific function, and so on. Again, the application program code decides how many message handlers there are and what dialogs are to be controlled.

A message handler, then, receives from the message loop those messages that are intended for the dialog or dialogs controlled by the message handler. The message handler may also send messages to another message handler. If so, the message handler sends the message to an operating system, which has its own message queue for receiving messages from various sources. The operating system then sends the message on to the intended recipient.

Besides receiving messages from the application program, the operating system further responds to user input, such as mouse clicks or keyboard input, by sending a message to the message loop of the application program for which the user input is intended.

Under Windows, functions are available for communicating a host of possible messages. For example, the application program "pulls" messages intended for one of its message handlers from the operating system using a GetMessage function. The application program further sends a message to an intended message handler using a DispatchMessage function. Any messages sent to the operating system may arrive using a SendMessage functions or a PostMessage function. The SendMessage function does not "complete" until the intended recipient receives the message, so SendMessage essentially blocks further execution by the submitting entity. The PostMessage function, by contrast, returns immediately upon "posting" the message to the operating system, thus permitting the submitting entity to perform other tasks immediately.

For each function, arguments are passed. One argument further identifies the message being submitted to the recipient. A second argument identifies the dialog for which the message is intended. In Windows, each dialog has a unique 32-bit identifier called a handle. When the handle of a dialog is not known, Windows provides a function, FindWindow, to retrieve the handle for a dialog. The requestor may provide other identifying information about the dialog, such as its location on the screen, its name, its level, and so on, and, from there, receives the desired handle from the FindWindow function.

Figure 2:
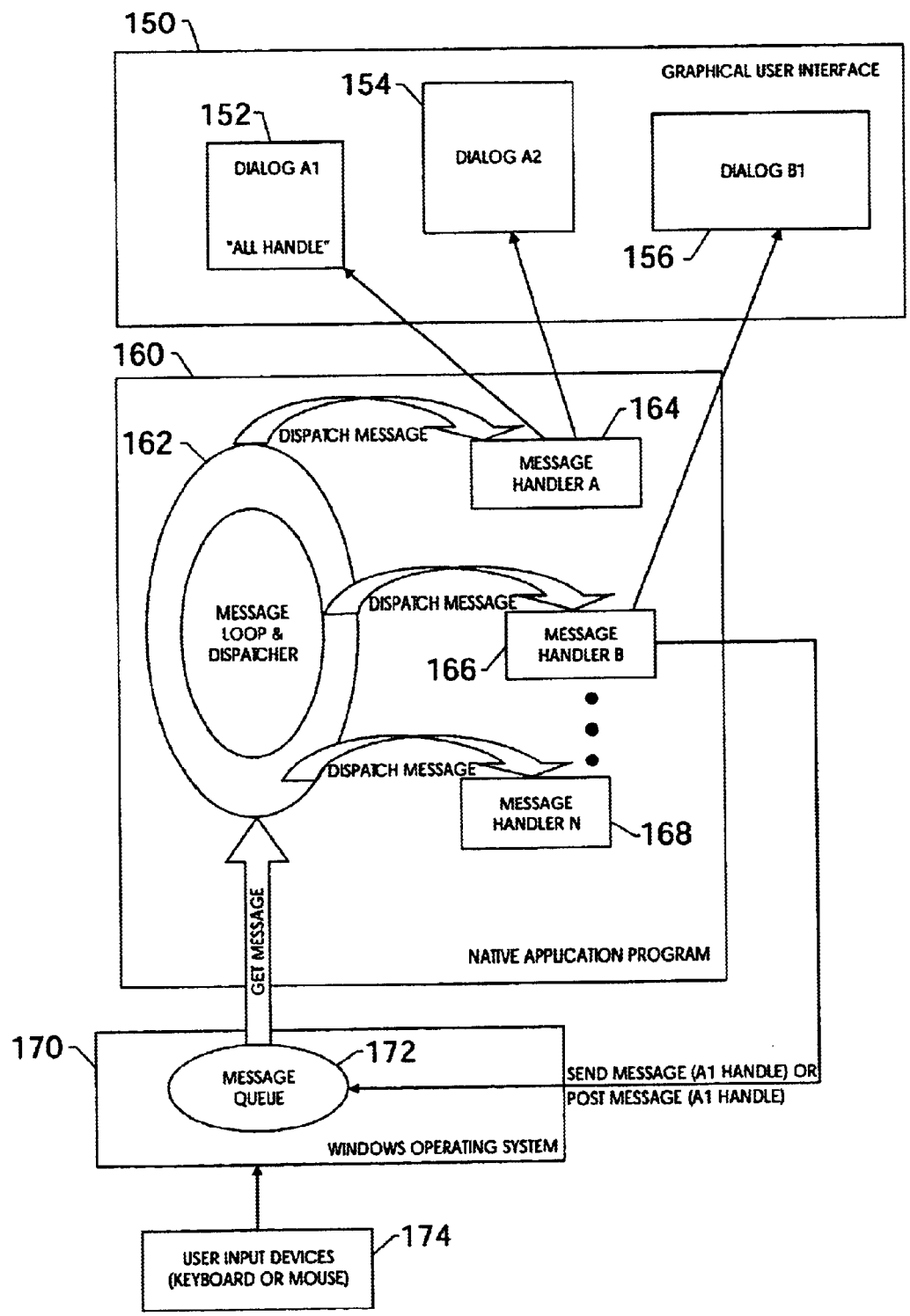
FIG. 2 is a block diagram illustrating how different software components of an application program keep track of native dialogs on a graphical user interface under a Win32 operating system environment.

FIG. 2 illustrates this mechanism pictorially. Because the discussion, above, describes generally how dialogs on a GUI are tracked under a Microsoft Windows operating environment, FIG. 2 shows a Windows operating system 170. Also shown is a graphical user interface 150 and an application program 160. Because the operating system 170 is Windows-based, the application program 160 is compiled to be Windows-compliant.

For purposes of explaining the illustrative system, the native application program 160 and the operating system 170 show only the components which are relevant to describing one way in which dialogs on a GUI may be tracked. Numerous other components of the native application program 160 and the operating system 170 are omitted to avoid obscuring the description of the relevant subject matter.

The graphical user interface 150 includes three dialogs: a dialog A1 152, a dialog A2 154, and a dialog B1 156. Each dialog is identified both by name (usually, this is the name seen at the top of the dialog) and by its handle. Each of dialogs A1 152, A2 154, and B1 156 may have a message sent to it by any entity which knows its unique handle.

Next, FIG. 2 shows the Windows operating system 170, which is shown coupled to a user input device 174. A user of the application program 160 commonly "communicates" with the graphical user interface 150 by pressing a key on a keyboard or clicking on a mouse. The operating system 170 receives this user input from the user input device 174. The operating system 170 further includes a message queue 172, which is a portion of code that, in effect, routes messages to the element that controls the GUI accessed by the user, in this case the native application program 160. Messages which are sent to the message queue 172 typically arrive via either the SendMessage or PostMessage functions. For example, if the user clicks on a mouse 174, a SendMessage command may be sent to the message queue 172 of the operating system 170 by a driver program (not shown) that controls the mouse 174. Also the application program 160 may issue a PostMessage command to the operating system 170.

As part of the native application program 160, which is Windows-based, FIG. 2 also shows a message loop and dispatcher 162. This is a portion of code which essentially retrieves available messages from the operating system 170 and passes them to an appropriate message handler for the intended dialog. Then, a message handler A 164, a message handler B 166, and a message handler N 168 are shown. The ellipses are meant to convey that any number of message handlers could be present in the native application program 160.

The message loop and dispatcher 162 pulls messages from the operating system 170 by repeatedly calling the GetMessage function. Upon receiving a message from the operating system 170, the message loop and dispatcher 162 then sends the message to the appropriate message handler using the DispatchMessage function. Both the GetMessage and DispatchMessage operations are illustrated in FIG. 2.

A single message handler may control multiple dialogs. Thus, the message handler A 164 is shown coupled to the dialog A1 152 and the dialog A2 154 in the graphical user interface 150. The message handler B 166 is coupled to the dialog B1 156. The message handlers receive the message information and communicate with the dialogs, as needed.

In FIG. 2 an arrow is also drawn from the message handler B 166. The message handlers themselves may issue SendMessage and PostMessage commands to the operating system 170. Thus, one dialog can, through the message handlers, essentially communicate with another dialog, as needed. Rather than directly issuing a SendMessage or PostMessage command, it should be understood that a command having SendMessage or PostMessage as a subset may instead be issued.

Suppose the message handler B 166 wants to communicate with the dialog A1 152. Suppose the dialog A1 152 has a handle, A1handle, as shown in FIG. 2. The message handler B 166 may issue a PostMessage command, including the A1handle as an argument, to the message queue 172 of the operating system 170. The message loop and dispatcher 162 of the application program 160 retrieves the message from the operating system 170 using the GetMessage command. Then, because A1handle is passed as an argument, the message loop and dispatcher 162 knows than the dialog A1 152 is the intended recipient. So, the dispatcher 162 issues a DispatchMessage command to the message handler A 164, as the control mechanism for the dialog A1 152.

Thus, FIG. 2 illustrates several mechanisms which together enable multiple dialogs, or windows, on a graphical user interface 150 to be supported. First, the operating system 170 acts as the main repository of messages from all sources in the system. Second, the application program 160 pulls messages intended for dialogs supported by the application program 160 and dispatches the messages to one or more message handlers. Third, the dialog to which a message is intended is identified using a unique handle. Fourth, different dialogs can essentially communicate with one another by posting messages to the operating system 170.

Figure 3:
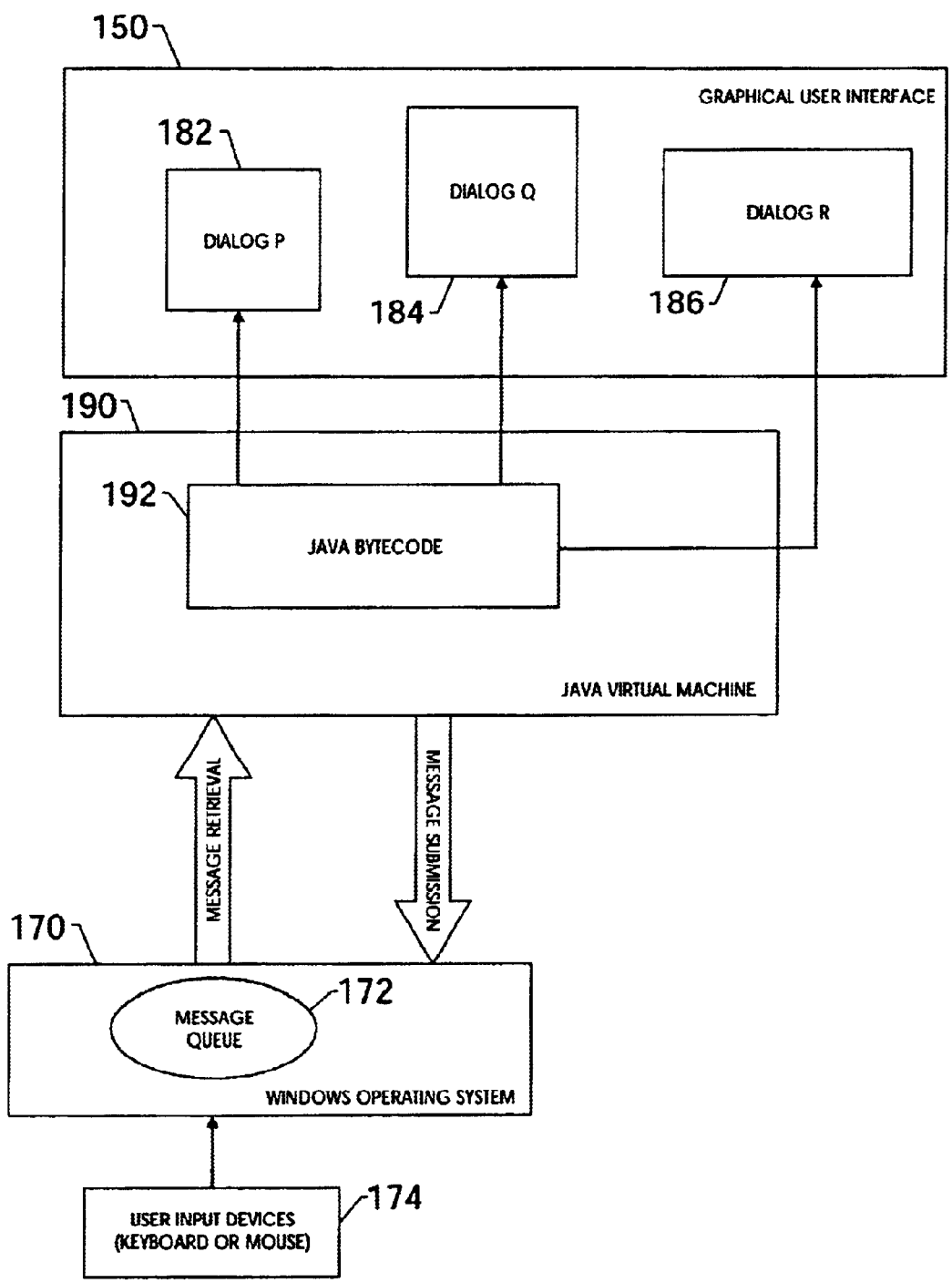
FIG. 3 is a block diagram illustrating how a Java virtual machine application program keeps track of native dialogs on a graphical user interface under a Win32 operating system environment.

FIG. 3 is a second block diagram which shows a Java virtual machine 190 as the application program under Windows. As FIG. 3 shows, the Java virtual machine 190, or JVM 190, is simply a type of application program. Thus, it may employ a mechanism similar to that shown in the more general illustration of FIG. 2 for keeping track of dialogs on a graphical user interface 150.

The operating system 170 of FIG. 3 is identical to that of FIG. 2, a Windows operating system. The Java virtual machine 190 is therefore a Windows-compliant application program, which means the JVM 190 is compiled explicitly for Windows. As such, the JVM 190 is capable of posting messages to the operating system 170 and pulling messages from the message queue 172 of the operating system 170 just as can any application program 160 that runs under the Windows operating system 170.

Despite being compiled to run under Windows, the JVM 190 may or may not employ the mechanisms described in conjunction with FIG. 2. In general, the Java programming language uses methods and objects to perform operations. Thus, message passing may not be the mechanism by which dialogs communicate in Java. FIG. 3 therefore shows a more general interface to the operating system 170, one of "message retrieval" and "message submission."

The JVM 190 includes a Java bytecode 192. The Java bytecode 192 depends upon the presence of a JVM 190 in order to run, as explained above. Whether the Java bytecode 192 employs distinct "handlers" for each dialog on the graphical user interface 150 is unclear.

What is known about the Java bytecode 192 is that when a Java-based dialog is created, the Windows operating system 170 is not informed, as is the case when a native-based dialog is created. Java-based dialogs may be assigned unique handles upon their creation, for example, but because the operating system 170 is not informed by the dialogs, the handles appear not to be used.

FIG. 3 shows three Java-based dialogs on the graphical user interface 150: a dialog P 182, a dialog Q 184, and a dialog R 186. Upon creation, the operating system 170 is not informed of their presence on the graphical user interface 150. Thus, one of the key mechanisms described in FIG. 2 for communication between dialogs on a graphical user interface, the assignment of a unique handle, is not available to the native application program 160.

Figure 4:
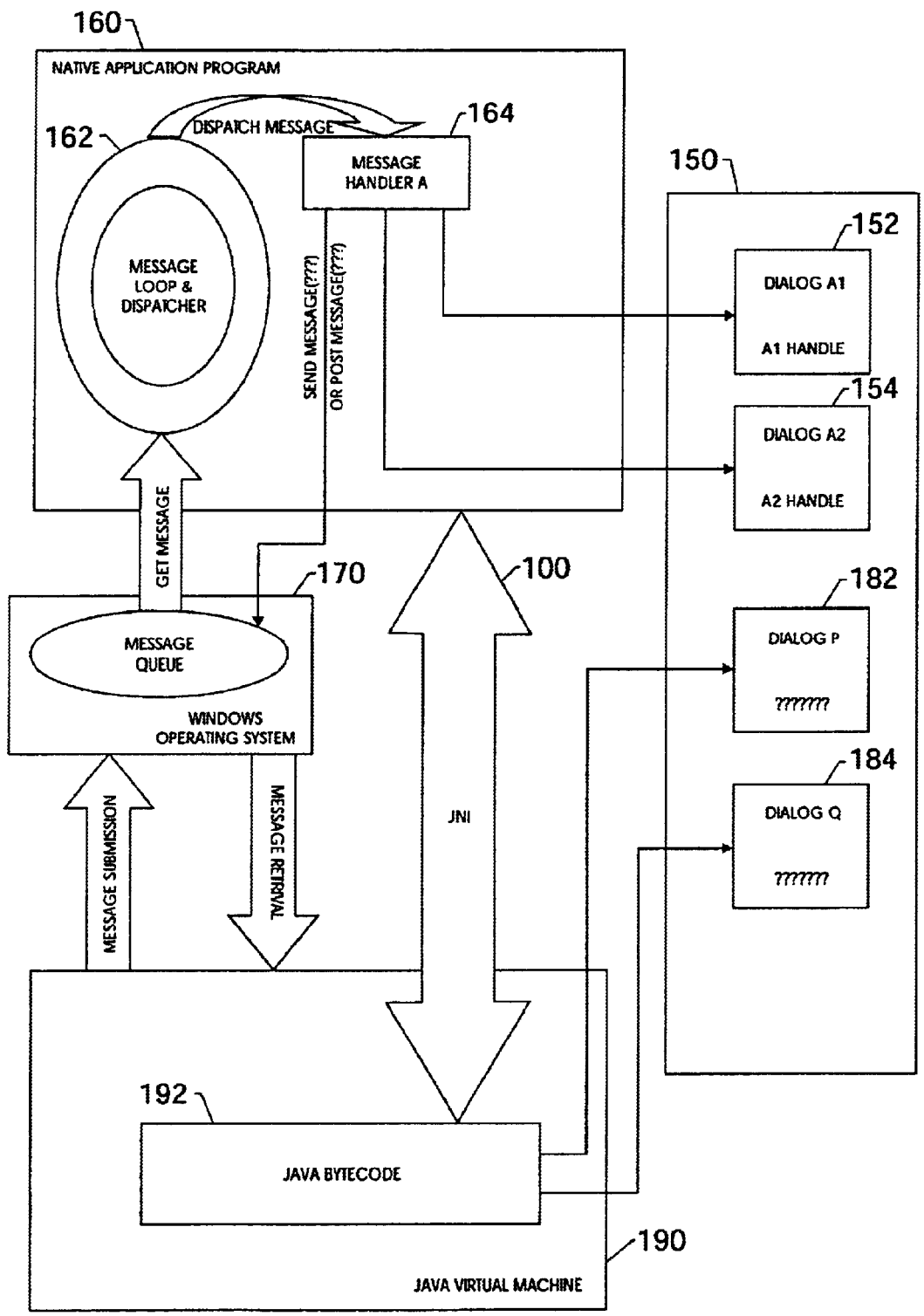
FIG. 4 is a block diagram of a native application program coupled with a Java-based application program, both of which support dialogs on a graphical user interface, but which cannot communicate information to the dialogs of each.

FIG. 4 depicts both the application program 160 of FIG. 2 and the Java virtual machine 190 of FIG. 3 together as creators of different dialogs on the graphical user interface 150. Some of the dialogs are controlled by the native application program 160 while others are controlled by the JVM 190. FIG. 4 thus illustrates an application program which contains code to support new dialogs on a GUI using the Java programming language and code to support other dialogs in the native language of the application.

If the message handler 164 needs to send a message to the dialog P 182 or the dialog Q 184, FIG. 4 shows that, under the mechanism described in FIG. 2, the issuance of a SendMessage function to the operating system 170 is no longer available. This is because the message handler 164 knows the handle for neither the dialog P 182 nor the dialog Q 184. In fact, the message handler A 164 may not even know about the dialogs P 182 and Q 184.

FIG. 4 also shows the JNI 100 of FIG. 1. Recall that the JNI 100 is the interface between native application programs and Java bytecode. The JNI 100 is intended to facilitate interaction between these two pieces of software. For example, a native application program 160 may, through the JNI 100, call Java methods, as needed, to perform particular functions. So, as long as the message handler A 164 of FIG. 4 knows what Java method to call, the message handler A 164 should be able to send messages to either the dialog P 182 or the dialog Q 184 of FIG. 4.

Unfortunately, a call through the JNI 100 by a native application program 160 has adverse consequences for maintenance of the graphical user interface 150. This is because a call through the JNI 100 blocks and does not return until the Java method called through the JNI 100 is completed. Other dialogs A1 152 and A2 154 cannot be maintained during this blocking period. To the user, the application program 160 appears to be locked up, although the application program 160 is not really locked up at all.

As a practical illustration, suppose an application program is written using the C programming language. Suppose then that additional features are added to the application program, including a dialog for the GUI, but it is written using C++ programming language. Such a scenario is possible because both the old, C-based code and the new, C++-based code must be compiled to run on the same platform, whatever it may be. So, in the case of a Windows operating system, both the old and new programs are compiled using a Windows-compliant compiler, the first being a C compiler and the second being a C++ compiler.

The same is not true for Java, however. If a new feature is added to the user interface 150 of an application program 160, it may be written using Java. The Java-based addition controls a new dialog. However, since Java is inherently platform-independent, it does not compile to a particular machine or platform, but only to bytecode.

Figure 5:
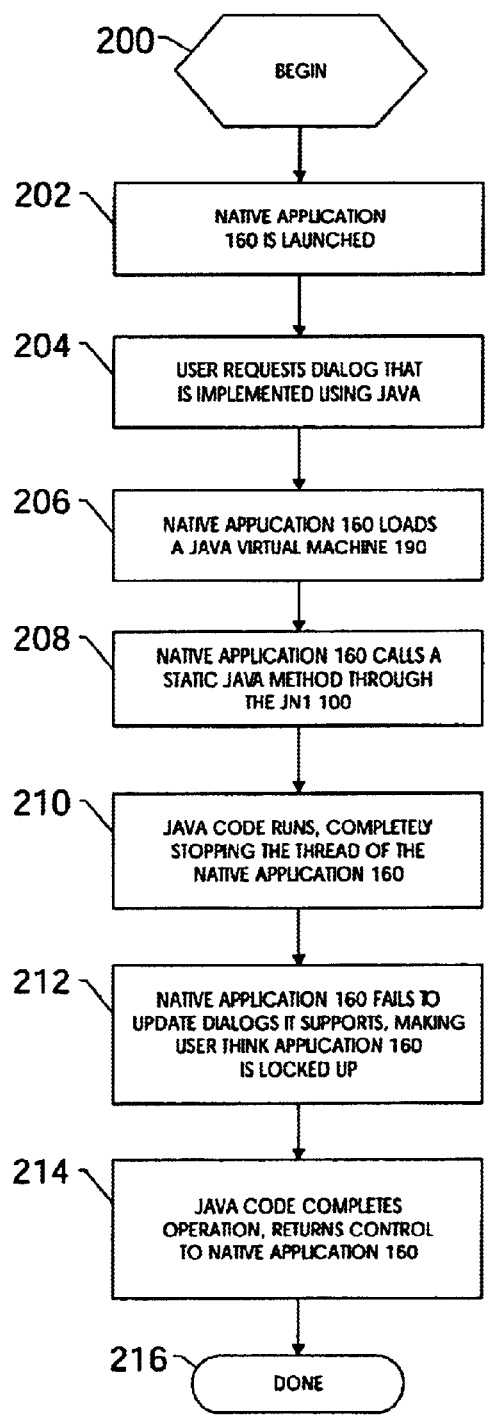
FIG. 5 is a flow diagram illustrating how using JNI blocks updates to native dialogs.

FIG. 5 is a flow diagram illustrating a problem with JNI. The process begins at step 200. First, the native application 160 of FIG. 4 is launched, at step 202. Then, at step 204, a user performs an operation, using a user input device 174, that causes a Java dialog to be launched.

At this point, shown as step 206, the native application 160 loads a Java virtual machine 190. (This step is not necessary if the JVM 190 has been previously launched.) Then, through the JNI 100, the native application 160 calls a static Java method to launch a Java dialog, at step 208. The Java code which controls the new Java dialog runs, which effectively blocks other activity by the native application code 160, at step 210. The Java code is a separate thread from the native application code 160, yet by blocking activity by the native application 160, the graphical user interface 150 appears to be locked up.

Because of the Java code block, step 212 shows that the native application 160 fails to update the dialog or dialogs its supports, making the user think the application 160 is locked up. In fact, however, the application 160 is not locked up, but the dialogs supported by the application 160 are not maintained during this time. During this time, the dialogs controlled by the native application 160 are not responsive to user input and are not "repainted." At step 214, the Java code completes its update of the Java dialog and control returns to the native application 160. At step 216, the process is complete.

The illustrative system solves a problem shown in FIG. 5 by letting the native application 160 return immediately following the Java method call through the JNI. Then, the Java code, a separate thread from the native application 160 calls through the JNI into the native application 160, which may be thought of as a "reverse JNI" call. During this reverse JNI call, the Java thread provides the text name of the Java dialog to the native application 160.

Once the native application 160 knows the name of the Java dialog, a call to FindWindow retrieves the handle of the Java dialog. Once the handle of a dialog is known, the dialog may be manipulated in a number of ways. For example, the position on the graphical user interface 150 can be changed, the size of the dialog can be modified, and so on.

In a disclosed embodiment, once the Java handle is retrieved, the icon for the Java-based dialog (which looks like a steaming cup of coffee) is replaced with an icon for the native application 160. In this way, the Java-based dialog looks to the user like a native dialog. Also, the native application 160 can capture the Java dialog into a Windows multi-document interface, or MDI, framework, in one embodiment. MDI is described in more detail in conjunction with the description of FIGS. 9a, 9b, and 9c, below.

Meanwhile the Java code thread continues running as long as the Java dialog is opened. Whenever the native application 160 needs to manipulate the Java dialog, a SendMessage or a PostMessage is sent to the operating system 170, passing the invisible dialog handle as an argument. The invisible dialog then contacts the Java dialog, through the JNI, causing the Java dialog to be updated as desired.

Because the native application 160 and the Java bytecode 192 are distinct code threads, the illustrative system simply allows the calling thread (the native application 160) to return from the call to the Java thread. Instead, the Java thread simply identifies the newly created dialog by name. Further, the problem of Java not identifying its dialogs with handles is avoided by the native application 160 creating an "invisible" dialog with which it can perform messaging operations normally.

Figure 6:
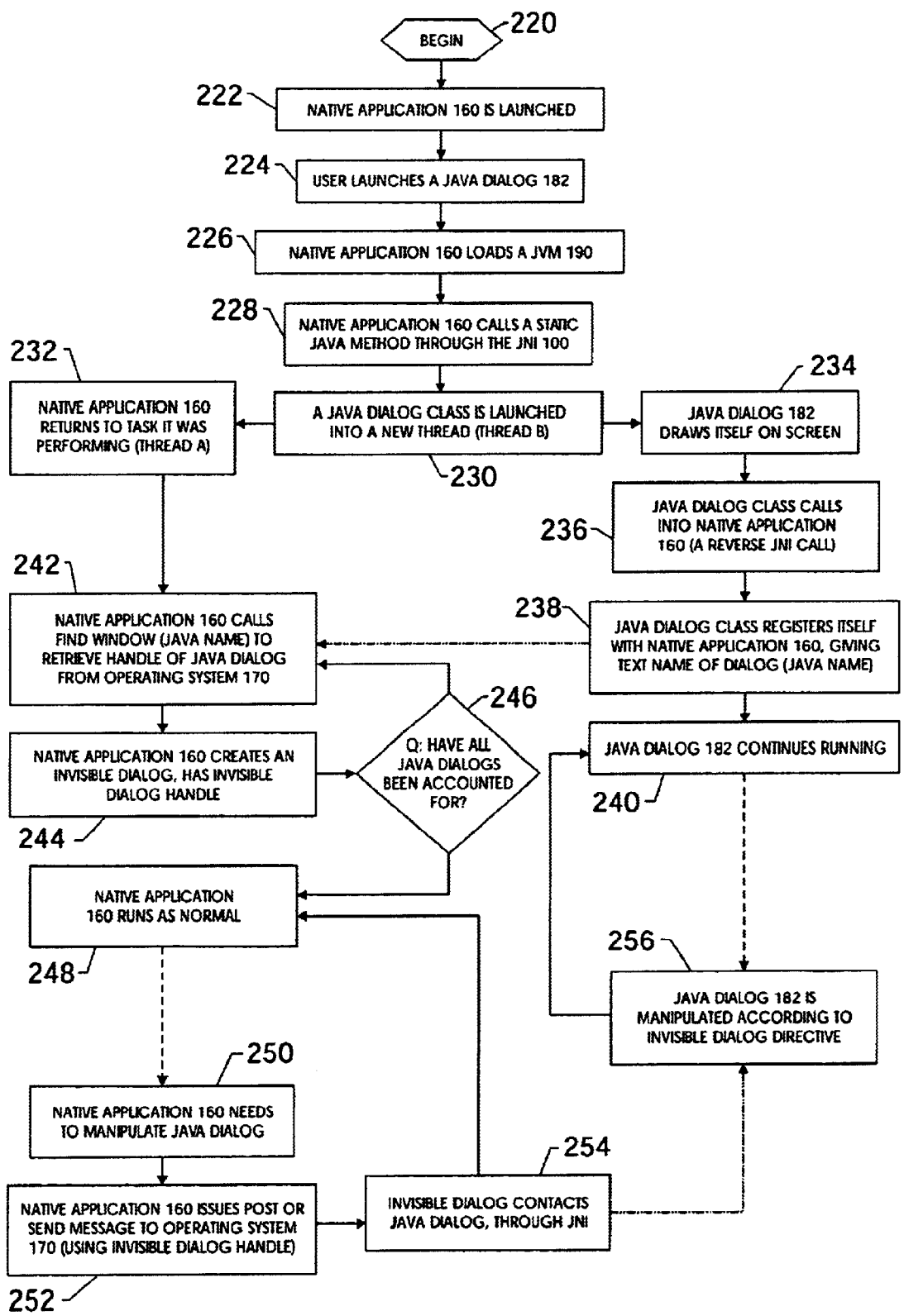
FIG. 6 is a flow diagram illustrating how the illustrative system enables a native application to communicate with a Java-based dialog.

FIG. 6 shows how the illustrative system addresses a problem of FIG. 5. The process begins at step 220. At step 222, the native application 160 is launched. Next, at step 224, the user performs an operation which causes a Java dialog 182 to launch to the user interface 150. The JNI 100 may be utilized in launching the Java dialog 182. The native application 160 then loads a Java virtual machine 190, at step 226. Step 226 will not be performed if a Java virtual machine 190 is already loaded.

At step 228, the native application calls a static Java method through the JNI 100. This causes a Java dialog class to be launched into a new thread, shown at step 230. The steps described so far are identical to those in FIG. 5. In FIG. 6, however, the native application 160 immediately returns to whatever task it was performing prior to the launch of the Java dialog 182. The JNI "block", which impaired the updates to the user interface 150 in FIG. 5, does not affect the native application 160 in this case because the blocking is very short. In fact, the blocking is unnoticeable to a viewer of the graphical user interface 150. Thus, the native application 160 is able to perform as normal and does not appear to be locked up by the user. The second thread, shown as thread B in FIG. 6, begins by the Java dialog 182 drawing itself on the screen, at step 234. Then, at step 236, the Java dialog class calls into the native application 160 and registers itself. In FIG. 6, step 236 is described as a reverse JNI call because generally calls through the JNI typically pass from the application software to the Java byte code. Step 238 shows that the actual registration of the Java dialog class takes the form of providing the name of the dialog to the native application 160.

Once the Java dialog 182 is registered with the native application 160, the handle of the Java dialog can be retrieved from the operation system 170. Thus, at step 242, in thread A, the native application 160 calls FindWindow giving it the Java name that was registered to it by thread B, and retrieves the handle of the Java dialog from the operating system 170. As stated above, in one embodiment, the handle is used to replace the "coffee" icon on the Java dialog 182 with one appropriate for the native application 160. Further, the native application 160 uses the Java dialog handle to capture the Java dialog 182 into a Windows MDI framework, in one embodiment. MDI is described in more detail in conjunction with the description of FIGS. 9a, 9b, and 9c, below.

Subsequently, the native application 160 creates an invisible dialog having an invisible dialog handle, shown at step 234. In one embodiment, a linked list is maintained by the native application program 160 which establishes a connection between each Java-based dialog 182 and the invisible dialog which "shadows" the Java-based dialog 182.

At step 246, a query is made whether all Java dialogs have been accounted for. If not, control proceeds back to step 242 where a new call to FindWindow is made for each Java dialog that has been registered with the native application 160. Otherwise, control turns to step 248 where the native application 160 runs normally.

At this point, both threads A and B are still running. At some point later the native application 160 may wish to manipulate the Java dialog 182. For example, user input may prompt such need. Or, the native application 160 may want to put an icon on the Java dialog 182 that resembles the icons of the other native dialogs. So, in step 250, the native application 160 needs to manipulate the Java dialog 182. At step 252, the native application 160 issues a PostMessage or a SendMessage to the operating system 170 using the invisible dialog handle as an argument. The invisible dialog then, at step 254, contacts the Java dialog 182 through JNI. Following this step in thread A, the native application 160 returns to normal. Thus, an arrow is shown from step 254 back to step 248. However, a dashed arrow is shown between steps 254 and step 256, which is a step in thread B. Step 256 shows that the Java dialog 182 is manipulated according to the invisible dialog directive. From there control proceeds to step 240 where the Java dialog 182 continues running.

If the native application 160 wants to close the Java dialog 182, steps 250 through 256 would also be utilized to achieve the closure of the Java dialog 182. It is at the point when the Java dialog 182 is closed that thread B goes away. In the disclosed embodiment, a Java dialog 182 is closed using the JNI.

Using the approach outlined in FIG. 6, the native application 160 has control over the Java dialog 182, via the invisible dialog, sufficient to manipulate the Java dialog 182 in a manner that appears seamless to the user. For one, the generic Java Runtime Environment (JRE) icon that typically appears at the top left corner of the dialog can be replaced with an icon that matches the other dialogs supported by the native application 160. Further, the Java dialog 182 can be controlled by the native application 160, such that the dialog can be moved, closed, and, at the very least, made known to the native application 160 in the first place. Under the current JNI protocol, such GUI manipulation was not possible. The tight integration of the Java window with the native code windows permits these useful operations to take place in a manner that is seamless to the end user.

Figure 7:
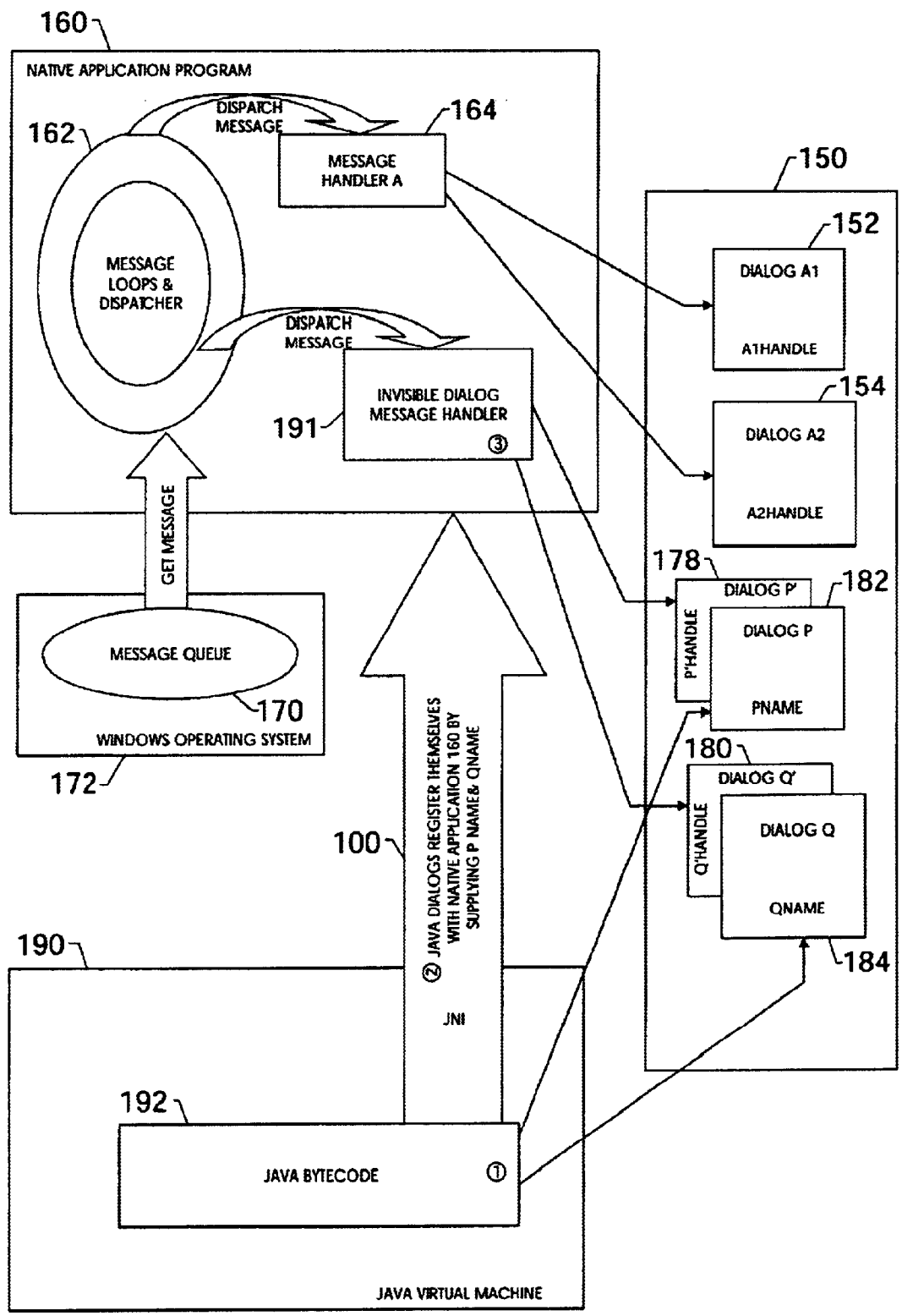
FIG. 7 is a block diagram depicting the process of registering a Java-based dialog with the native application code.
Figure 8:
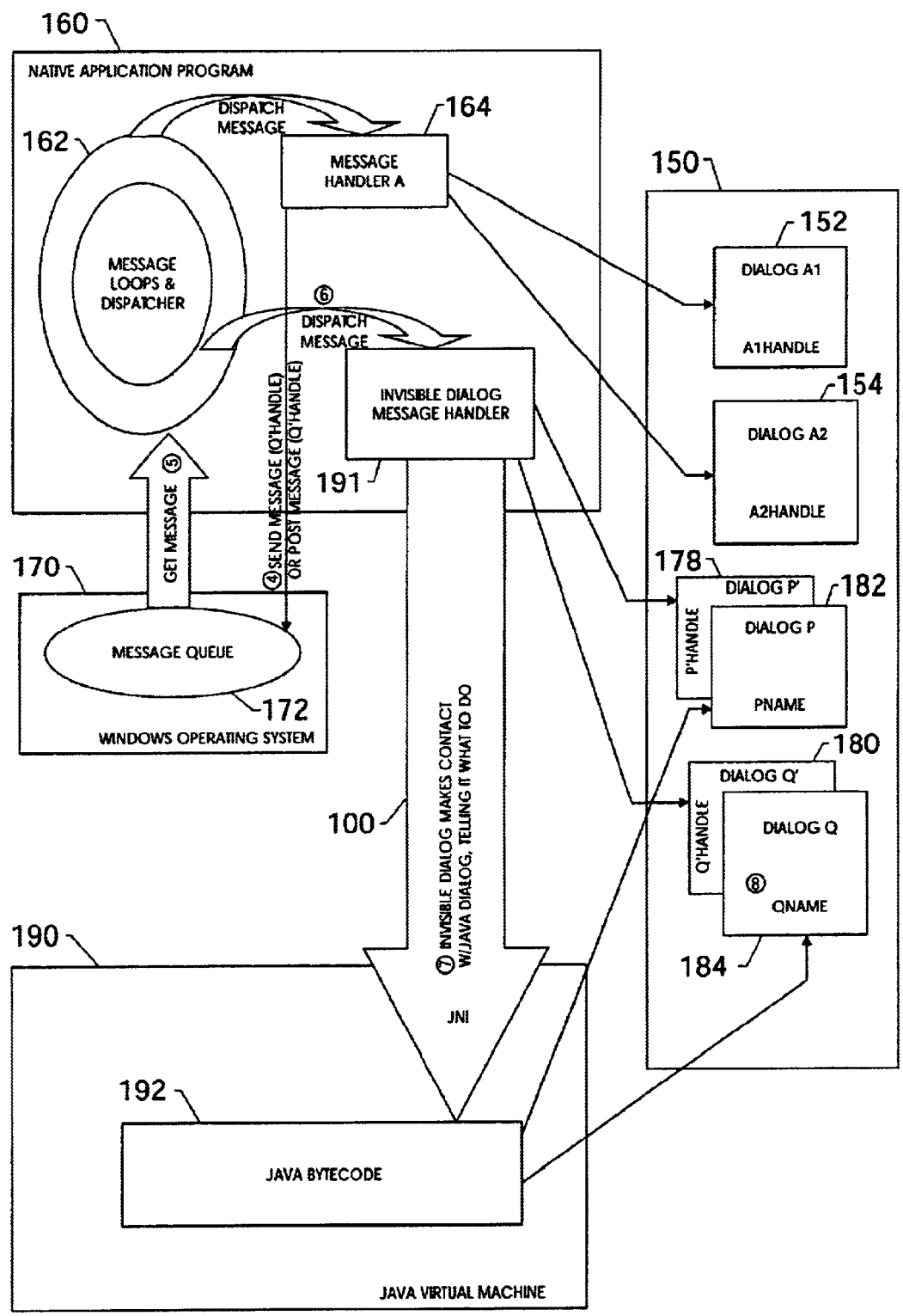
FIG. 8 is a block diagram depicting the process of controlling a Java-based dialog by the native application code.

FIGS. 7 and 8 pictorially represent what occurs in the flow diagram of FIG. 6. FIG. 7 focuses on the registration of the Java-based dialogs P 180 and Q 182 on a graphical user interface 150. FIG. 8 is dedicated to how a native application program 160 updates the Java-based dialogs P 180 and Q 182.

First, in both figures, a dialog P' 178 and a dialog Q' 180 are shown. These represent the "invisible" dialogs which essentially shadow the Java-based dialogs P 182 and Q 184. The handles for these invisible dialogs P' 178 and Q' 180 are P'handle and Q'handle, respectively, as shown. Also shown in FIGS. 7 and 8 is an invisible dialog message handler 191, which is dedicated to supporting the invisible dialogs P' 178 and Q' 180. Although a single handler 191 is shown, a separate handler can be implemented for each invisible dialog, if desired.

As stated, FIG. 7 shows the steps, as described in FIG. 6, for "registering" one or more Java dialogs. The block diagram of FIG. 7 includes three symbols to identify the order of occurrence: ①,②, and ③. Notice that, in FIG. 7, the JNI 100 is depicted as an arrow going from the Java bytecode 192 to the native application program 160. This illustrates that a "reverse JNI" call is made during registration of the Java-based dialogs P 182 and Q 184.

First, the Java-based dialogs P 182 and Q 184 are created by the Java bytecode 192, shown as a ① in FIG. 7. Then, according to the illustrative system, the Java dialogs P 182 and Q 184 register themselves with the native application 160 by supplying their names, Pname and Qname. This is sent through the JNI 100 and is shown as a ② in FIG. 7.

Once the Java dialogs P 182 and Q 184 register themselves with the native application program 160, the native application program 160 creates invisible dialogs P' 178 and Q' 180 to essentially "shadow" the Java-based dialogs P 182 and Q 184. As the invisible dialogs P' 178 and Q' 180 are generated by the native application program 160, handles P'handle and Q'handle are assigned to them, as would be done with any other dialog created by the native application program 160. Along with the dialogs P' 178 and Q' 180 themselves, an invisible dialog message handler 191 is available to process requests made to these dialogs, identified in FIG. 7 as a ③. This completes the "registration" of a Java-based dialog.

Moving on to FIG. 8, the control of a Java-based dialog by the native application program 160 is now depicted as steps ④, ⑤, ⑥, ⑦ and ⑧ in the figure. When a native dialog wants to communicate with a Java-based dialog, the illustrative system makes this possible once the registration of FIG. 7 has taken place.

First, suppose dialog A1 152 or dialog A2 154 wants to communicate with the dialog Q 184, the latter a Java-based dialog. First, shown as step ④ in FIG. 8, the message handler A 164, which processes requests for dialogs A1 152 and dialog A2 154, issues a message to the message queue 172 of the operating system 170. Instead of providing the handle of the Java dialog Q 184, however, the message handler A 164 passes the argument Q'handle, or the handle of the invisible dialog Q' 180 along with the SendMessage or PostMessage command. This step is depicted as a ④ in FIG. 8.

Next, the message loop and dispatcher 162 retrieves the message from the message queue 172 of the operating system 170, using the GetMessage command. Depicted as a ⑤ in FIG. 8, this step is normally how any message intended for a message handler of the native application program 160 is retrieved, as explained in the description of FIG. 2, above. Again, the argument Q'handle identifies that the message is intended for the invisible dialog Q' 180. The message loop and dispatcher 162 then submits the message to the invisible dialog message handler 191 using the DispatchMessage command, shown as a ⑥ in FIG. 8.

Using the JNI 100, the invisible dialog message handler 191 next makes contact with the Java bytecode 192 which controls the intended Java dialog Q 184, shown as a ⑦. The invisible dialog message handler 191 tells the Java bytecode 192 what to do to the Java dialog Q 184. Finally, shown as ⑧ in FIG. 8, the dialog Q 184 is updated according to the directive of the message handler A 164 of the native application program 160.

Additional updates to all "registered" Java-based dialogs P 182 and Q 184 of the graphical user interface 150 can be made until the Java-based dialogs P 182 and Q 184 are finally closed by the native application program 160.

The illustrative system may be employed under an MDI framework. As stated above, the disclosed embodiment captures the Java dialog into an MDI framework as soon as its handle is known (see description of FIG. 6, above). MDI is a specification that defines a user interface for applications that wish to support more than one document at the same time. MDI employs a single primary dialog or window, called a parent window, to visually contain other windows, or child windows, inside its borders. Thus, the parent window provides a visual and operational framework for the child windows. Once the Java dialog is part of the MDI framework, the Java dialog is virtually indistinguishable from other native dialogs in the application program 160.

Figure 9A:
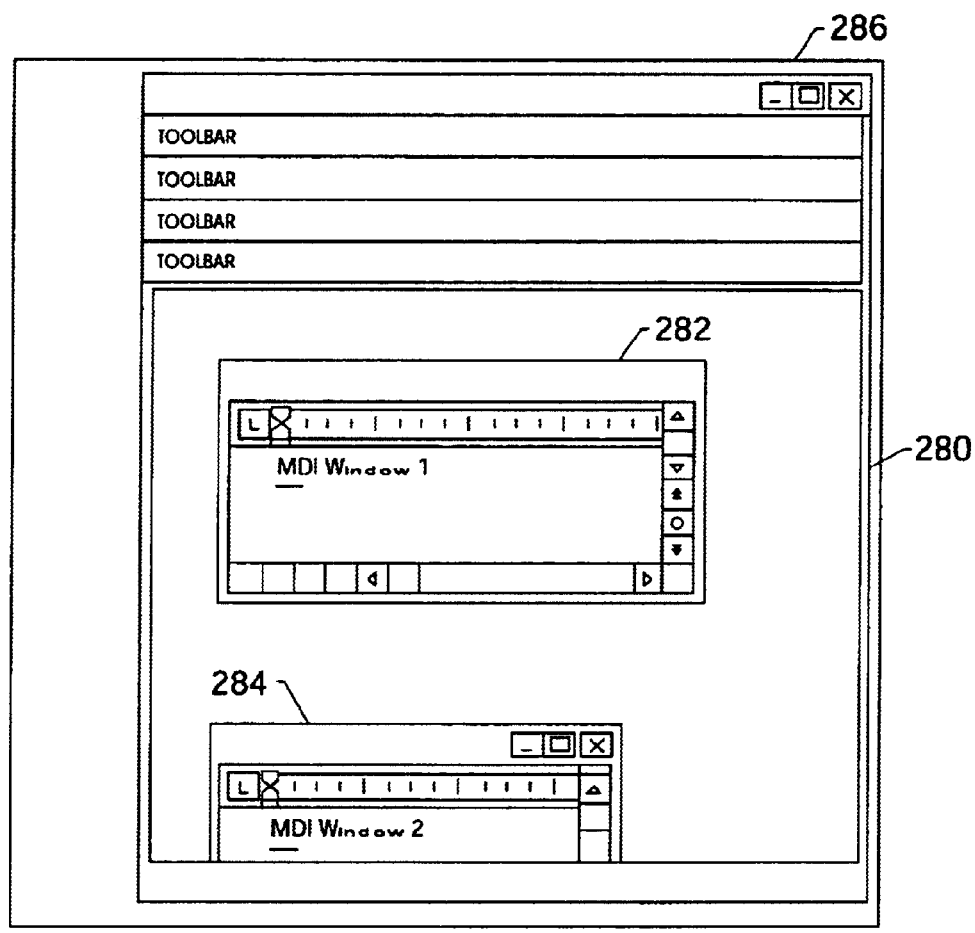
FIG. 9a is a screen shot of an MDI framework in a word processing application program, including a parent window and two child windows.

FIG. 9a is a screen shot which illustrates the use of MDI by a word processor, Microsoft Word. Here, the MDI parent window is the application window 280. A first MDI window 282 and a second MDI window 284 are shown. The MDI window 284 is truncated by the MDI boundary of the parent application, rather than overlapping onto the desktop 286.

Figure 9B:
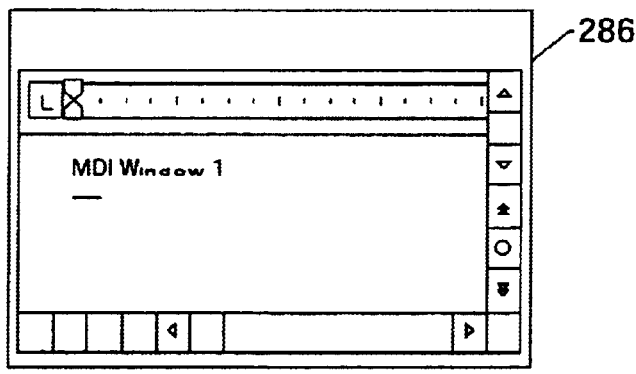
FIG. 9b is a screen shot of a window in which it is unclear whether MDI is being employed.

FIG. 9b is a second screen shot, which shows a window 286. The window 286 has the text "MDI window I" inside it. However, but for this text, it is not clear whether the window 286 is an MDI window. Without seeing a parent window 280 or a desktop 286, such as shown in FIG. 9a, the MDI status of the window 286 is unknown.

Figure 9C:
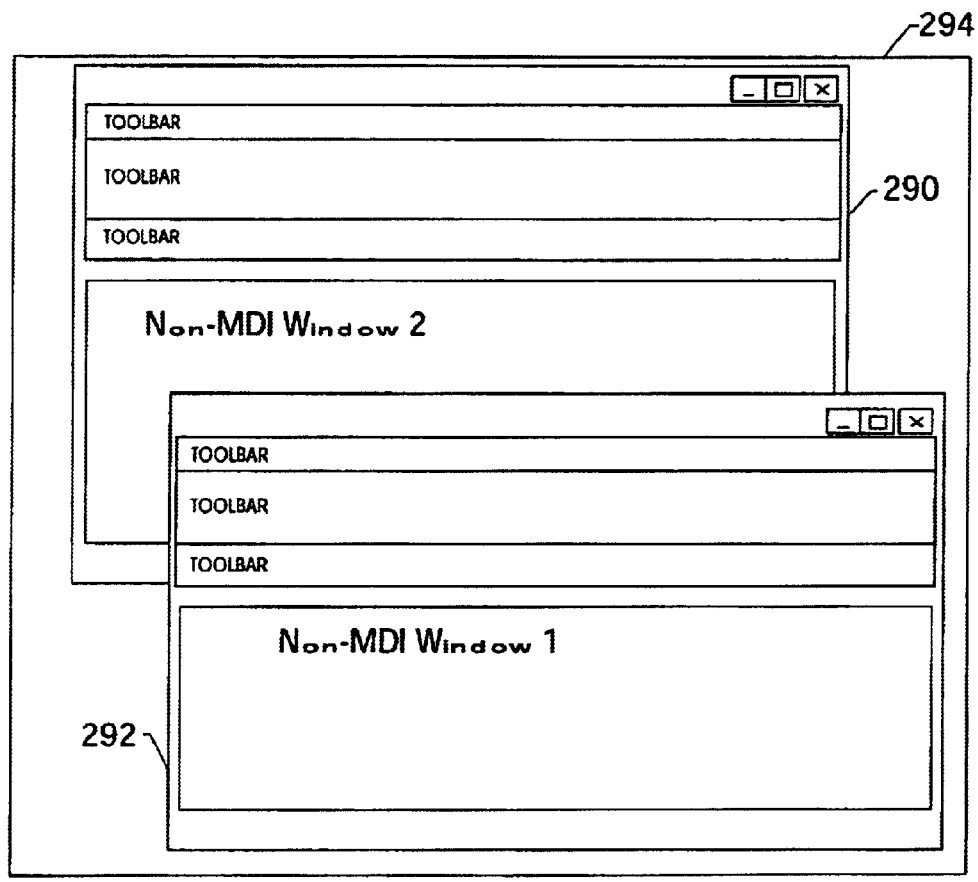
FIG. 9c is a screen shot of two non-MDI windows on a desktop.

FIG. 9c is a third screen shot. This figure shows two non-MDI windows, both using the Netscape browser software. A first window 292 and a second window 294 are shown in FIG. 9c. Notice that the two non-MDI windows are separate of each other. Notice, too, that both windows 292 and 294 appear directly on the desktop 294. No parent window, as in FIG. 9a, encapsulates the two windows 292 and 294.

The illustrative system may be used in either an MDI framework or a non-MDI framework. In one embodiment which uses MDI, a Java dialog is captured into the MDI by calling a SetWindowParent function. The arguments in the SetWindowParent function include both the parent window handle and the Java window handle.

The applications for the illustrative system depicted in FIGS. 6, 7, and 8 are numerous. Virtually any application program which supports multiple dialogs on a graphical user interface may employ the methodology described herein to integrate new Java-based support into the application. For example, the assignee of this patent, Compaq Computer Corporation, of Houston, Tex., currently utilizes the illustrative system in connection with its network management software, Compaq Networking Management Software, or CNMS. CNMS provides network support for a large number of devices under a Microsoft Windows operating environment.

Under CNMS, each device on the network is supported by a distinct product management module, or PMM. The PMMs are designed to run in a number of operating environments. For example, CNMS runs under Windows, but, from a web browser, a user can also access CNMS on a web server. The PMMs may be used in either environment. The use of the term "PMM" throughout this disclosure should be understood to encompass management modules, which might also be termed software plug-ins.

As part of CNMS, a graphical user interface provides a visual representation of the device supported by each PMM. Newer PMMs are typically written using the Java programming language. The core CNMS, however, is written using the Win32 API. Thus, for many if not most of the screens that appear on a graphical user interface of CNMS, some dialogs are Win32-based while others are Java-based. Thus, the illustrative system provides a mechanism for communication between these different dialogs.

Figure 10:
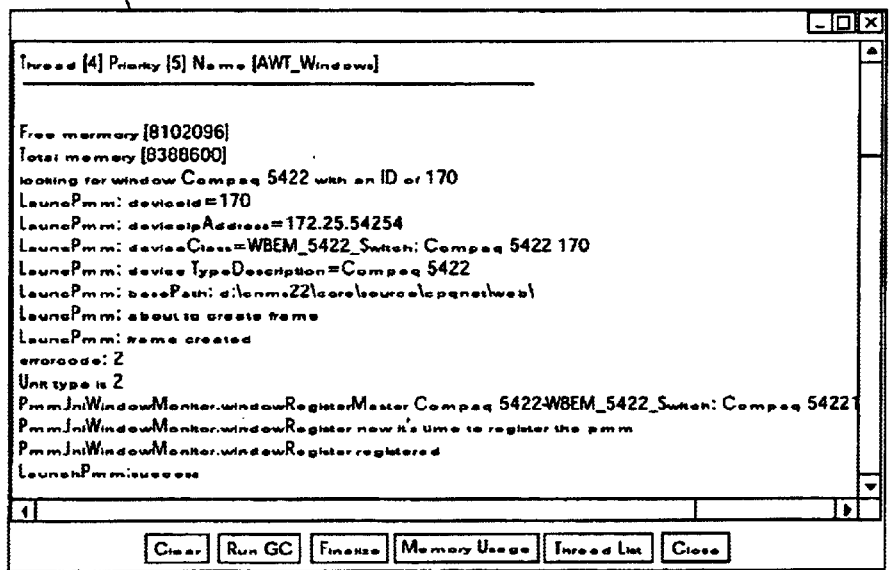
FIG. 10 is a screen shot of a Java-based dialog, including a Java icon.

FIG. 10 is a screen shot of a Java-based dialog 300 before being integrated into a native application 160, as described above. The name of the Java-based dialog 300 is "PMM Session Debug," as shown at the top of the dialog. FIG. 10 shows how the Java-based dialog contains a Java icon 302, which looks like a steaming cup of coffee. The Java icon 302 is ideally replaced with an icon representative of the native application 160, once the Java-based dialog 300 is incorporated with other dialogs of the native application 160.

Figure 11:
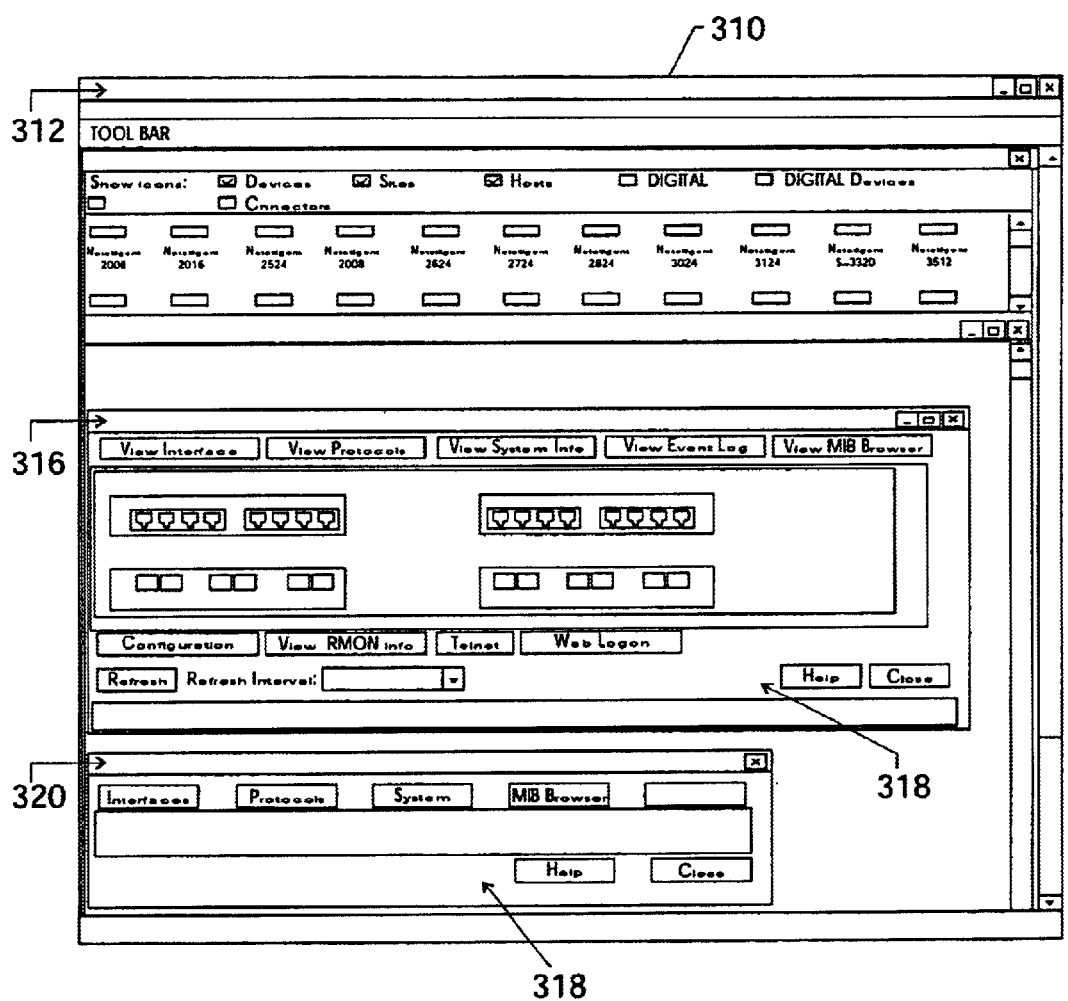
FIG. 11 is a screen shot of CNMS, including both dialogs controlled by native code and Java code.

FIG. 11 is a screen shot showing a Java-based dialog 314, after being integrated into a native application 160. The native application 160 presents a native dialog 310, entitled "Compaq Networking Management Software," as shown. This dialog 310 has an icon 312 in its upper left corner. The Java-based dialog 314 is also shown with an icon 316. Although the dialog 314 is Java-based, the icon is not the Java icon 302, the steaming cup of coffee, as seen in FIG. 10. Instead, the Java icon 302 has been replaced with an icon 316 which represents the device being managed, here a 5422 gigabit switch. Recall that this icon replacement occurs once a FindWindow command is issued to the operating system 170 to retrieve the handle of the Java dialog (step 248 of FIG. 6).

FIG. 11 also shows a dialog 318 which is written in the C programming language. Like the CNMS dialog 310 and the Java-based dialog 314, the dialog 318 includes an icon 320 at the top left of the dialog. Thus, FIG. 11 shows how dialogs created in both C and Java can coexist on a graphical display and appear to be from the same source. Finally, FIG. 11 also illustrates use of MDI in one embodiment. The dialog 310 is a parent window, while the dialogs 314 and 320 are child windows.

The foregoing disclosure and description of the various embodiments are illustrative and explanatory thereof, and various changes in the components, code segments, software interfaces and components, functions, methods, classes, dialog boxes, native interfaces, and windows, as well as in the details of the illustrated software and construction and method of operation may be made without departing from the spirit and scope of the invention.

We claim:

1. A method of configuring a JAVA window to be accessible by a native application, comprising the steps of:
   executing a native application in a first thread;
   launching a JAVA window in a second thread;
   returning to execution of the native application in the first thread after the launching step; and
   registering the JAVA window with the native application.

2. The method of claim 1, the registering step comprising the step of:
   providing a text name of the JAVA window to the native application.

3. The method of claim 1, the registering step comprising the step of:
   executing a native interface call to the native application by the JAVA window.

4. The method of claim 1, further comprising the step of:
   loading a JAVA virtual machine by the native application.

5. The method of claim 1, wherein the native application is network management software and the JAVA window is a product management module window.

6. A computer system adapted for JAVA window control by a native application, comprising:
   a JAVA virtual machine having a native interface;
   an operating system coupled to the JAVA virtual machine; and
   a native application coupled to the operating system,
   wherein the native interface, the operating system, and the native application are configured to perform the following steps:
      executing the native application in a first thread;
      launching a JAVA window in a second thread;
      returning to execution of the native application in the first thread after the launching step; and
      registering the JAVA window with the native application.

7. The computer system of claim 6, the native interface, the operating system and the native application being configured to perform the further steps of:
   creating an invisible window in the native application;
   sending a command for the JAVA window to the invisible window; and
   passing the command from the invisible window to the JAVA window through the native interface.

8. The computer system of claim 7, the sending step comprising:
   calling a messaging function by the native application with a handle of the invisible window.

9. The computer system of claim 7, the native application, the operating system, and the native interface configured to perform the step of:
   executing the command by the JAVA window.

10. The computer system of claim 7, the native application, the operating system, and the native interface configured to perform the step of:
    executing the command by the invisible window.

11. The computer system of claim 7, wherein the native application is network management software and the JAVA window is a management module window.

12. The computer system of claim 6, the launching step comprising the step of:
    loading the JAVA virtual machine by the native application.

13. The computer system of claim 6, the registering step comprising the step of:
    executing a call by the JAVA window to the native application though the native interface.

14. The computer system of claim 6, the registering step comprising the step of:
    providing a text name of the JAVA window to the native application.

15. The computer system of claim 6, further comprising:
    a processor coupled to the operating system.

16. The computer system of claim 6, further comprising:
    a graphical user interface containing the JAVA window.

17. The computer system of claim 6, wherein the native application is a WINDOWS application and the operating system is a WINDOWS operating system.

18. The computer system of claim 6, wherein the native application is network management software and the JAVA window is a product management module window.

19. A computer system adapted for JAVA window control by a native application, comprising:

a means for executing a native application in a first thread;

a means for launching a JAVA window in a second thread;

a means for returning to execution of the native application in the first thread after launching the JAVA window;

a means for calling the native application by the JAVA window; and a means for registering the JAVA window with the native application.

20. The computer system of claim 19, further comprising:

a means for loading a JAVA virtual machine by the native application.

21. The computer system of claim 19, the means for calling comprising:

a means for executing a native interface call to the native application by the JAVA window.

22. The computer system of claim 19, the means for registering comprising:

a means for providing a text name of the JAVA window to the native application.

23. The computer system of claim 19, further comprising:

a video display containing a graphical user interface to display the JAVA window.

24. A processor readable medium, comprising:

code to execute a native application in a first thread;

code to launch a JAVA window in a second thread;

code to return to execution of the native application in the first thread after launching the JAVA window;

code to call the native application by the JAVA window; and code to register the JAVA window with the native application.

25. The processor readable medium of claim 24, the code to register the JAVA window comprising:

code to provide a text name of the JAVA window to the native application.

26. The processor readable medium of claim 24, the code to call the native application comprising:

code to execute a native interface call to the native application by the JAVA window.

27. The processor readable medium of claim 24, further comprising:

code to load a JAVA virtual machine by the native application.

\* \* \* \* \*